T. E. BARNUM.
SYSTEM OF CONTROL FOR ELECTRIC MOTORS.
APPLICATION FILED JULY 6, 1908.

991,189.

Patented May 2, 1911.
4 SHEETS—SHEET 3.

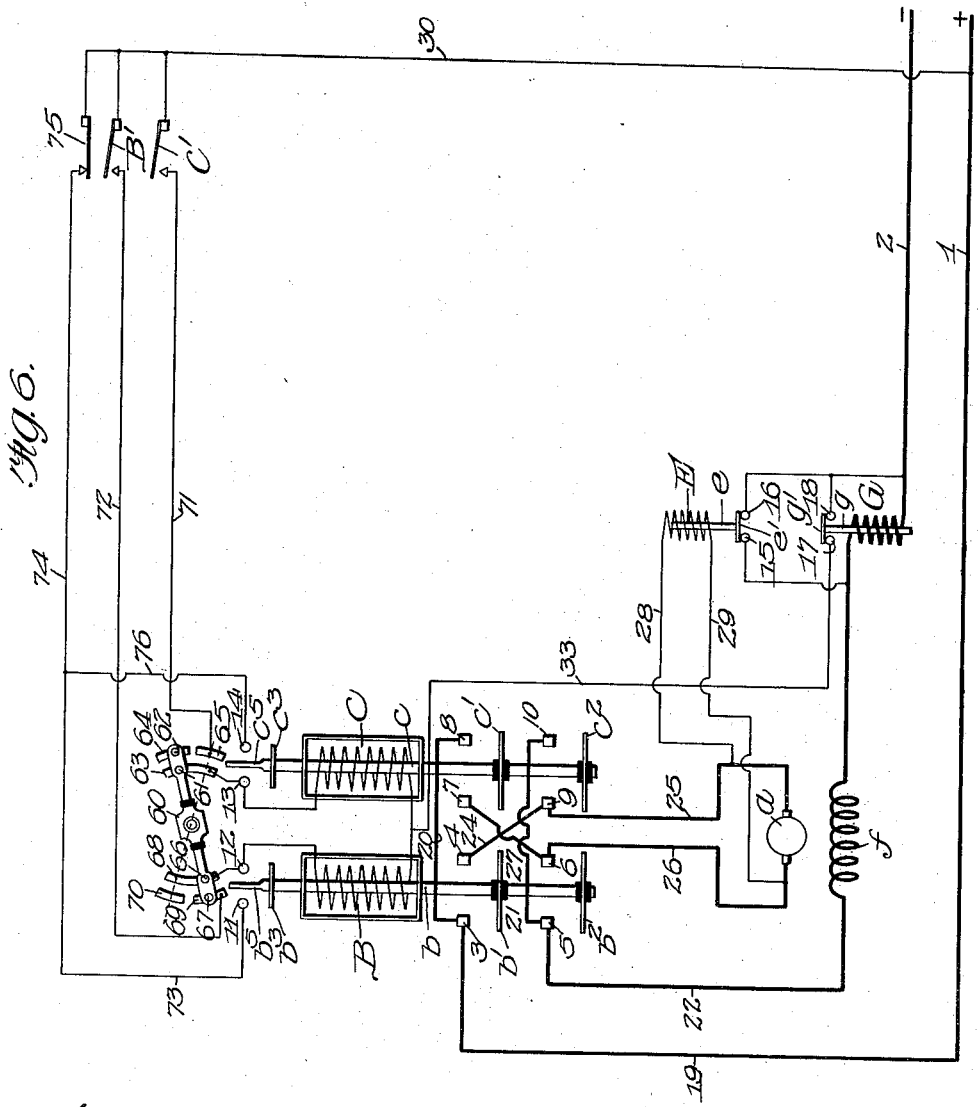

UNITED STATES PATENT OFFICE.

THOMAS E. BARNUM, OF MILWAUKEE, WISCONSIN, ASSIGNOR TO THE CUTLER-HAMMER MFG. CO., OF MILWAUKEE, WISCONSIN, A CORPORATION OF WISCONSIN.

SYSTEM OF CONTROL FOR ELECTRIC MOTORS.

991,189.      Specification of Letters Patent.      Patented May 2, 1911.

Application filed July 6, 1908. Serial No. 442,203.

*To all whom it may concern:*

Be it known that I, THOMAS E. BARNUM, a citizen of the United States, residing at Milwaukee, in the county of Milwaukee and State of Wisconsin, have invented new and useful Improvements in Systems of Control for Electric Motors, of which the following is a full, clear, concise, and exact description, reference being had to the accompanying drawing, forming a part of this specification.

My invention relates to improvements in systems of control for electric motors, and more particularly to systems for controlling motor operated valves wherein an overload device is employed.

One object of my invention is to provide means for rendering the overload device inoperative for a temporary period after the motor circuit is closed.

A further object is to provide means for indicating when the motor circuit is closed.

A further object is to provide means for indicating when the motor has attained normal speed.

A further object of my invention is to provide means for indicating the direction in which the motor was last operated.

A further object is to prevent the motor from operating in the same direction twice in succession.

Further objects and advantages of my invention will be hereinafter set forth.

In order to more clearly disclose my invention, I have illustrated certain embodiments thereof in the accompanying drawings.

Figure 1:
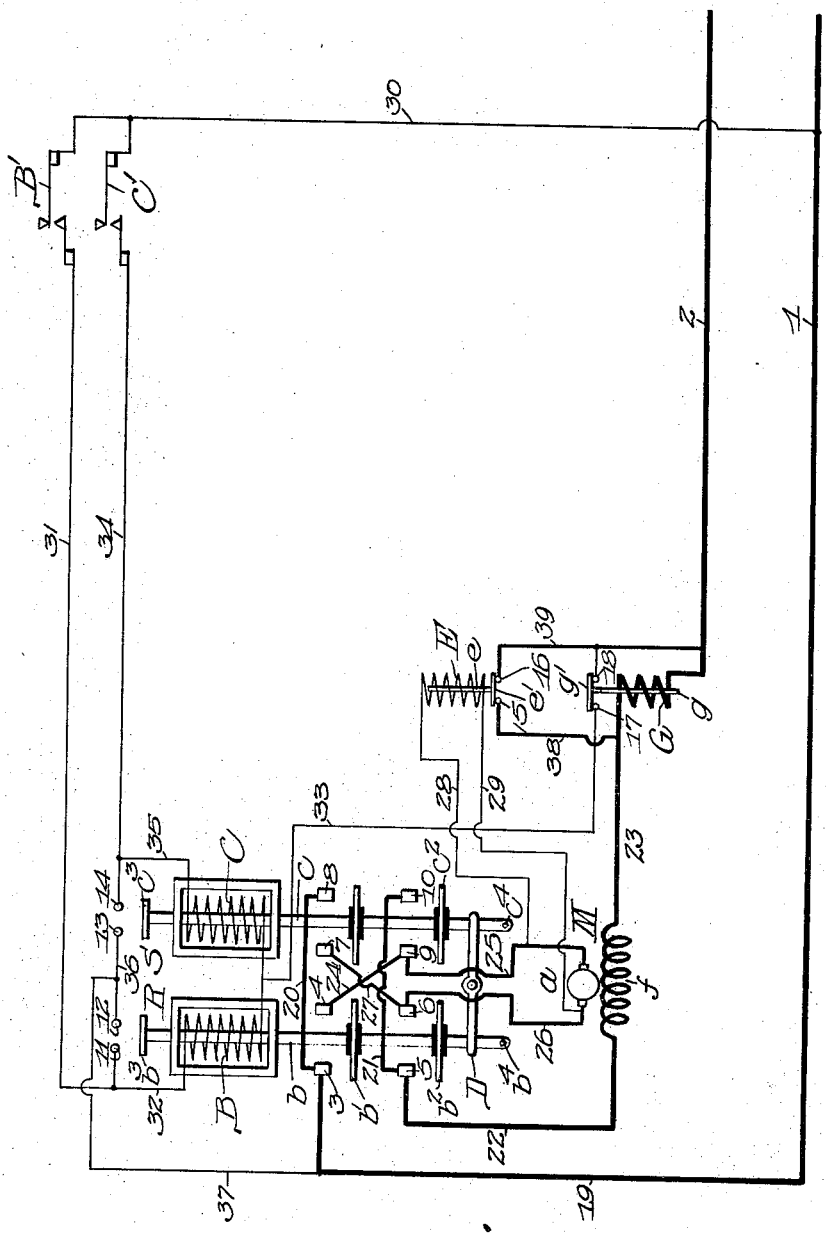
Figure 2:
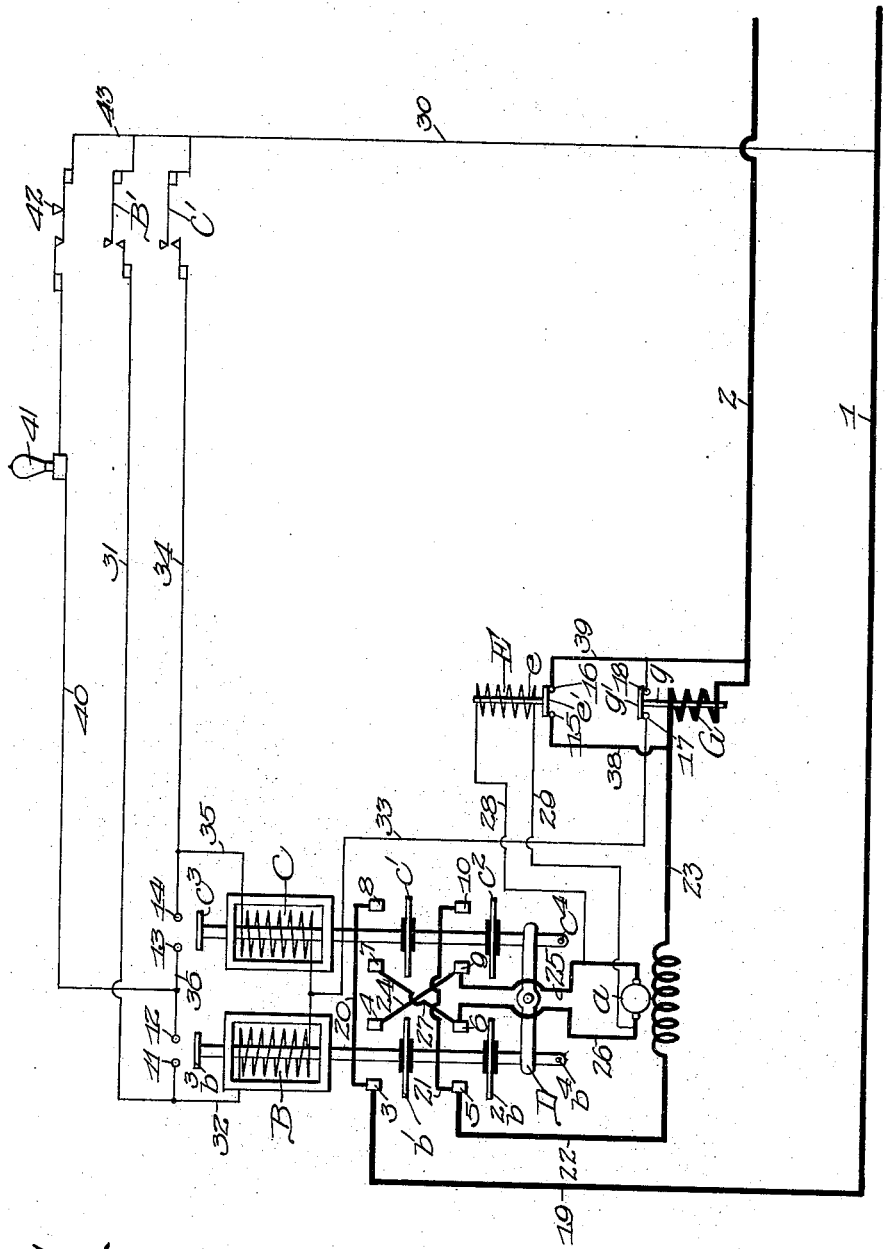
Figure 3:
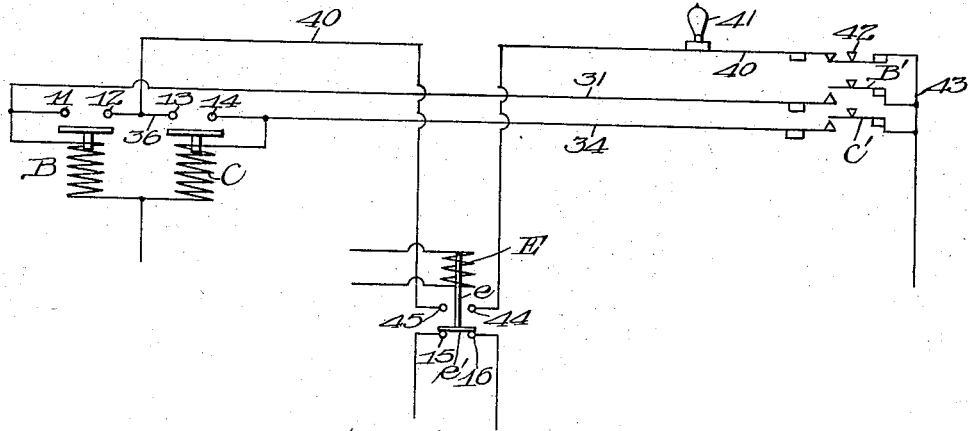
Figure 4:
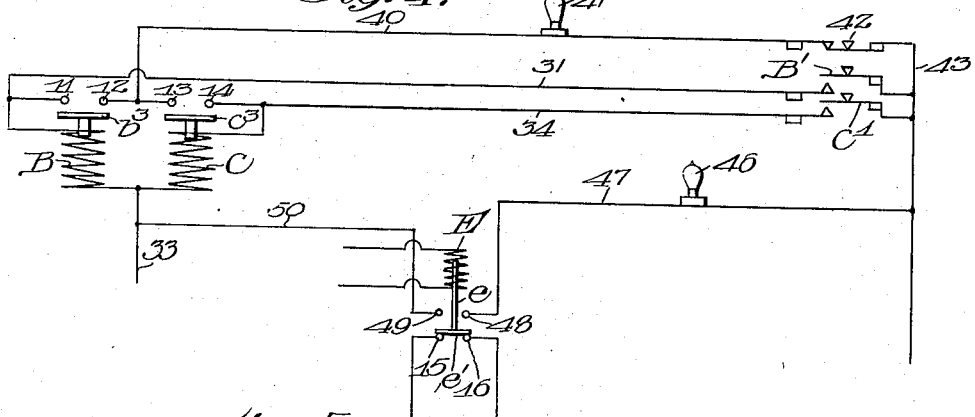
Figure 5:
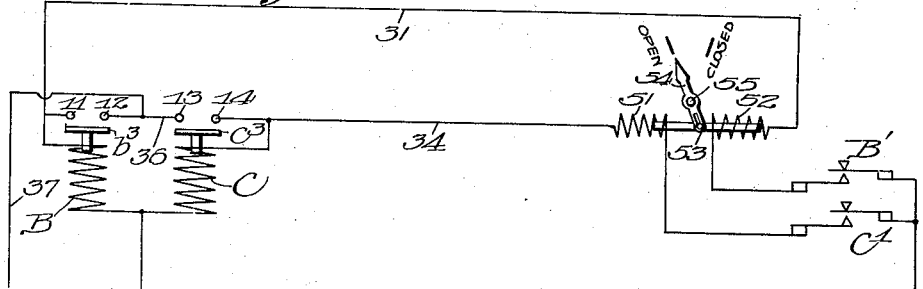

In the accompanying drawings—Figure 1 diagrammatically illustrates a system embodying my invention. Fig. 2 diagrammatically illustrates a system similar to that shown in Fig. 1 with certain additional features. Figs. 3, 4 and 5 diagrammatically illustrate other features which may be embodied in the system shown in Figs. 1 and 2, and Fig. 6 illustrates a modified form of the interlock shown in Fig. 1.

In the embodiment of my invention, illustrated in Fig. 1, I have shown a motor having an armature $a$, and a field winding $f$. The motor is supplied with current from the main lines 1 and 2 through a reversing switch RS. The reversing switch RS is provided with two electromagnetic windings B and C. The winding B is provided with a plunger $b$ and the winding C is provided with a plunger $c$. Mounted on the plunger $b$ and insulated therefrom are two switches $b'$ and $b^2$, preferably in the form of disks. The disk $b'$ is adapted to bridge stationary contacts 3 and 4 and the disk $b^2$ is adapted to bridge stationary contacts 5 and 6.

Mounted on the plunger $c$ and insulated therefrom are switches $c'$ and $c^2$, also preferably in the form of disks. The disk $c'$ is adapted to bridge stationary contacts 7 and 8, and the switch $c^2$ is adapted to bridge stationary contacts 9 and 10. At its upper end $b$ carries a contact plate, or switch $b^3$ adapted to bridge stationary contacts 11 and 12. Plunger $c$ carries at its upper end a contact plate, or switch $c^3$, adapted to bridge stationary contacts 13 and 14. To prevent both of these plungers from being raised at the same time I provide an interlocking device comprising a bar D pivoted at its center. This bar D is adapted to be engaged at its opposite end by pins $b^4$ and $c^4$, carried by the plungers $b$ and $c$, respectively. For controlling the circuit through winding B, I provide a push button B' and for controlling the circuit through winding C I provide a push button C'.

An overload winding G is connected in the motor circuit and is provided with a plunger $g$, carrying a contact $g'$ which normally bridges stationary contacts 17 and 18 connected in circuit with the windings B and C. Contacts 15 and 16 are connected in a short circuit around the winding G and are adapted to be bridged by a switch $e'$ carried by the plunger $e$ of a solenoid E which is connected across the terminals of the armature $a$.

The following is a description of the circuit arrangement of this system: Contact 3 is connected by conductor 19 to the main line 1. Contact 3 is also connected by conductor 20 to contact 8. Contact 10 is connected by conductor 21 to contact 5, which is connected by conductor 22 to one terminal of the series field winding $f$. The other terminal of the field winding $f$ is connected by conductor 23 with one terminal of the overload winding G, the other terminal of the winding B being connected to the main line 2. Contact 4 is connected by conductor 24 to contact 9, which is connected by conductor 25 to one terminal of the armature $a$. The other terminal of the armature $a$ is connected by conductor 26 to contact 6, which is connected by conductor 27 to contact 7. The winding E is connected across the armature $a$ by conductors 28 and 29. The windings B and C are connected in circuit in parallel. The circuit for winding B extends from main line 1 by conductor 30 through push button B′, conductors 31 and 32, through the winding B by conductor 33 to contact 17 across switch $g'$ to contact 18 and thence to main line 2. The circuit for winding C extends from conductor 30 through push button C′, conductors 34 and 35, through the winding C to conductor 33 and thence back to the main line 2, as already traced. Contact 14 is connected to conductor 34. Contact 13 is connected by conductor 36 to contact 12. Contact 11 is connected to conductor 32. Conductor 37 connects conductor 36 with conductor 19. Conductor 38 connects contact 15 to conductor 23 on one side of the winding G and conductor 39 connects contact 16 to main line 2.

The following is a description of the operation of this system: Assuming that the several windings are deënergized and their plungers are in the positions shown in the drawing, if push button B′ is closed, current will flow from main line 1 by conductor 30 through push button B′ by conductors 31 and 32 through the winding B by conductor 33 to contact 17 across switch $g'$ to contact 18, and thence to the main line 2. This results in the energization of the winding B which lifts its plunger $b$, causing the disks $b'$ and $b^2$ to bridge the contacts 3 and 4, and 5 and 6 respectively. This results in the closure of the motor circuit.

The motor circuit may be traced from main line 1 by conductor 19 to contact 3, across disk $b'$ to contact 4, by conductor 24 to contact 9, thence by conductor 25 through the armature $a$ by conductor 26 to contact 6, across disk $b^2$ to contact 5, by conductor 22 through the series field winding $f$ by conductors 23 and 38 to contact 15 across switch $e'$ to contact 16 and thence by conductor 39 to main line 2. The motor is thus started, but owing to the short circuit around the overload winding B, through conductors 38 and 39, the overload device is at this time prevented from operating to open the circuit of the winding B. At the same time that the motor circuit is closed, contact plate $b^3$ bridges contacts 11 and 12 with the result that a maintaining circuit for the winding B is established. This circuit may be traced from main line 1 by conductors 19 and 37 to contact 12 across contact plate $b^3$ to contact 11, thence by conductor 32 through the winding B to conductor 33 and to the main line 2, as already traced. As soon as this maintaining circuit is established the push button B′ may be released without interrupting the circuit through the winding B.

As previously stated, when the motor circuit is first closed the overload device G is prevented from operating, owing to the fact that a short circuit around the same is established by switch $e'$ bridging contacts 15 and 16. Inasmuch as there is little or no drop in potential across the armature when the motor circuit is initially closed there is little or no drop in potential across the terminals of the winding E, and hence the same will not respond. However, as the armature speeds up it generates a counter electromotive force which increases proportionally to the increase in the armature speed, and causes a gradually increasing drop in potential across the armature. The increase of the drop in potential across the armature causes a corresponding increase of the potential at the terminals of the winding E. When the motor reaches normal speed the potential at the terminals of the winding E is sufficiently increased to cause the same to respond and raise its plunger, thus raising the contact plate $e'$ from the contacts 15 and 16. This results in opening the short circuit around the overload winding G and in consequence the winding G is connected in series with the motor. If now an excessive current flows through the motor, the winding G will be energized and raise its plunger, thus opening the switch $g'$. This results in the opening of the circuit of the winding B which permits its plunger $b$ to fall, thus opening the motor circuit.

The system shown and described is particularly applicable for controlling motors for operating valves. In such services the motor becomes stalled upon the valve reaching either its final, open, or closed position. When the motor becomes stalled an excessive flow of current through the motor is caused, which energizes the overload winding G, which in turn opens the circuit through the reversing switch, with the result already described. It should be understood, however, that this system is applicable to other service, and as will hereinafter be explained, means may be provided for opening the motor circuit at will. It should also be understood that although I have not shown a starting resistance for protecting the motor during the starting period, such resistance may be employed without departing from the spirit of my invention.

As already explained, as soon as the overload device operates, it causes the deënergization of the winding B which results in the falling of the plunger $b$, thus opening the motor circuit. As soon as the motor circuit is opened the overload winding G is deënergized and its plunger $g$ falls, causing the contact plate $g'$ to again bridge the contacts 17 and 18. Also, as soon as the motor comes to a state of rest the winding E is deënergized and its plunger e falls, causing the contact plate e' to bridge the contacts 15 and 16. If now it is desired to cause the motor to run in an opposite direction, the push button C' is operated, which closes the circuit of the winding C. This circuit may be traced from the main line 1 by conductor 30 through push button C' by conductors 34 and 35 through winding C to conductor 33 and thence back to the opposite side of the main line, as already traced. When the winding C becomes energized it raises its plunger c, which closes the motor circuit. The motor circuit may now be traced from main line 1 by conductor 19 to contact 3, by conductor 20 to contact 8 across the disk c' to contact 7, by conductor 27 to contact 6 by conductor 26 through the armature a to conductor 25, contact 9, thence across disk $c^2$ to contact 10 by conductor 21 to contact 5, thence by conductor 22 through the series field winding f by conductors 23 and 38 to contact 15 across switch e' to contact 16 and then by conductor 39 to main line 2. It will thus be seen that the motor is caused to operate in the opposite direction from that already described, and that the short circuit around the overload winding G is again established, preventing the same from responding. When the plunger C is raised it causes contact plate $c^3$ to bridge contacts 13 and 14, which establishes a maintaining circuit for the winding C, which may be traced from the main line 1 by conductors 19 and 37 to contact 13 across switch $c^3$ to contact 14 by conductor 35 through the winding C to conductor 33, and thence to the opposite side of the main line. The push button C' can now be released without interrupting the circuit of the winding C. The operation from this point on is substantially the same as that already described. When the motor attains normal speed the potential at the terminals of the winding E is sufficient to cause the same to respond and raise its plunger to open the short circuit around the winding G. The winding G is thus placed in circuit in series with the motor and upon an excessive current flowing through the motor the winding G is energized and raises the switch g' which opens the circuit through the winding C. As soon as the circuit through the winding C is opened its plunger c' falls, thus opening the motor circuit. The opening of the motor circuit causes the deënergization of the windings E and G, and their plungers, therefore, fall to the position shown in the drawing. The motor may again be started and caused to operate in either direction, according to which one of the push buttons is operated.

The system shown in Fig. 2 is substantially the same as that shown in Fig. 1, except that instead of connecting conductor 36 to conductor 19 by conductor 37, I connect conductor 36 to conductor 30 by conductor 40, through lamp 41, push button 42 and conductor 43. The push button 42, in this instance, is normally closed. The remainder of the circuit arrangement is precisely like that shown in Fig. 1. The operation of this system is also the same as that already described, with the exception that the maintaining circuit for the windings B and C extends from conductor 30 by conductor 43 through push button 42, conductor 40 through lamp 41, thence through either the windings B or C, according to which one is energized, to the opposite side of the main line, as already described. With this arrangement when either of the plungers b or c is operated, said maintaining circuit is closed, thus closing the circuit through the lamp 41 which serves, when lighted, to indicate that the motor circuit is closed. If, after the motor has attained normal speed and the short circuit has been removed from around the overload winding G, an excessive current flows through the motor, the overload device will operate to open the circuit through the winding C or the winding B, according to which one has been energized. This results in the falling of its plunger which opens the maintaining circuit and consequently the lamp 41 ceases to burn, which indicates that the motor circuit has been opened. The purpose of the push button 42 is to provide means whereby the motor may be stopped at the will of the operator. As already set forth, when the maintaining circuit is established the push button which was operated to initially close the circuit through the winding energized, may be released. If now the push button 41 is operated it will open said maintaining circuit, which will cause the deënergization of the reversing switch, which will result in the opening of the motor circuit.

As shown in Fig. 3 the maintaining circuit just described in connection with Fig. 2 may be interrupted at contacts 44 and 45, said contacts being adapted to be bridged by the contact plate e' when the plunger e is raised. With this arrangement the maintaining circuit will not be closed until one of the plungers b or c has been raised and until the winding E has been energized to raise plunger e to cause the contact plate e', carried thereby, to bridge the contacts 44 and 45. As the winding E will not raise its plunger until the motor has attained a normal speed, circuit will not be closed through the lamp until the motor has attained full speed. With this arrangement it is necessary to maintain one of the push buttons B' or C' closed until the motor has attained full speed.

In Fig. 4 I have shown, in addition to the maintaining circuit, shown in Fig. 2, a parallel circuit including a lamp 46. The circuit for lamp 46 may be traced from conductor 30 by conductor 47 through lamp 46 to contact 48, across contact plate $e'$, when raised, to contact 49 and thence by conductor 50 to conductor 33. With this arrangement, as soon as the reversing switch has been operated, causing either of the plungers $b$ or $c$ to be raised, circuit will be closed through lamp 41, as described in connection with Fig. 2. When the motor attains full speed and the winding E raises its plunger, contact plate $e'$ will bridge contacts 49 and 48, with the result that circuit will be also closed through lamp 46. It will thus be seen that lamp 41 indicates when the motor circuit is closed while the lamp 46 indicates when the motor has attained full speed.

In Fig. 5 the circuit arrangement shown is like that shown in Fig. 1. But in this instance conductor 34 is provided with a winding 51 and conductor 31 with a winding 52. These windings are preferably in alinement and are provided with a common plunger 53. 54 is an indicating arm pivoted at 55 and having its lower extremity connected to plunger 53. With this arrangement, when the circuit is closed through the reversing switch by the closure of push button $B'$, the winding 52 will be energized, exerting a pull on plunger 53, which throws the indicator arm 54 to the left, as shown in the drawing. The indicating arm will remain in this position until the push button $C'$ is operated to cause the motor to run in the opposite direction. Upon the closure of the push button $C'$ the winding 51 will be energized, attracting plunger 53, which will throw the indicating arm to the right. It will thus be seen that this indicating arm serves to indicate the direction in which the motor was last operated. When this system is applied to a motor for operating a valve, this arm will serve to indicate whether the valve is open or closed.

Fig. 6 shows an interlocking arrangement for preventing the energization of either of the windings B or C of the reversing switch twice in succession. This interlock comprises a bar 60 pivoted at its center and having its extremities projecting into the paths of the projections $b^5$ and $c^5$, carried by the plungers $b$ and $c$ respectively. The right hand extremity of the bar 60 carries contact brushes 61 and 62. The brush 61 engages with a contact segment 63, while the brush 62 is adapted to engage with either of the segments 64 or 65. The left-hand extremity of the bar 60 carries brushes 66 and 67. The brush 66 engages with the contact segment 88, while the brush 67 is adapted to engage either of the contact segments 69 or 70. The brushes 61 and 62 are insulated from the brushes 66 and 67.

The circuit connections are as follows: Winding B is connected to contact 12, and contact 12 is connected to segment 68. Winding C is connected to contact 13, and contact 13 is connected to segment 63. Contact segment 65 is connected by conductor 71 through push button $C'$ to conductor 30. Contact segment 69 is connected by conductor 72 through push button $B'$ to conductor 30. Contact 11 is connected by conductors 73 and 74 through push button 75 to conductor 30. Contact button 14 is connected by conductor 76 to conductor 74. Contact segments 70 and 64 are dead.

Assuming that the bar 60 is in the position shown in the drawing, circuit may be closed through winding B by closing push button $B'$. This circuit may be traced from conductor 30 through push button $B'$ by conductor 72 to segment 69 to brush 67 by bar 60 to brush 66, thence to contact segment 68 to contact 12 through winding B and thence to the opposite side of the main line, as already traced in connection with the other figures. Circuit through the winding B having been closed, plunger $b$ will be raised to close the motor circuit. At the same time the projection $b^5$ will strike the left-hand extremity of the bar 60 and turn the same on its pivot until it reaches the position shown in dotted lines. In this position the brushes 66 and 67 would engage segments 68 and 70, while the brushes 61 and 62 would engage the segments 63 and 65. In this position the circuit through the winding by conductor 72 would be open and the winding B would be deenergized but for the fact that the contact plate $b^3$ bridges the contacts 11 and 12 and establishes a maintaining circuit therefor. This maintaining circuit may be traced from conductor 30 through push button 75 by conductors 74 and 73 to contact 11 across contact plate $b^3$ to contact 12, thence through the winding B to the opposite side of the main line, as already traced. The motor may be stopped at any time by operating the push button 75 which opens the maintaining circuit of the winding B thus permitting the descent of the plunger $b$ to open the motor circuit. After the motor circuit has been opened it is apparent that the winding B cannot be again energized until the bar 60 has been returned to the position shown in the drawing and the bar 60 will not be returned to such position until after the winding C has been energized. However, the winding C may be energized by operating the push button $C'$. The circuit for the winding for C may then be traced from conductor 30 through push button $C'$ by conductor 71 to segment 65 and brush 62 to brush 61 and segment 63 to contact 13, thence through the winding C to the opposite side of the line. This results in the raising of the plunger $c$ which closes the motor circuit to cause the motor to run in an opposite direction. When the plunger $c$ is raised it returns the bar 60 to position shown in full lines and at the same time causes the contact plate $c^3$ to bridge the contacts 13 and 14, which establishes a maintaining circuit for the winding C from conductor 74 by conductor 76 to contact 14 across contact plate $c^3$ to contact 13 and thence through the winding C to the opposite side of the main line. It will then be impossible to start the motor in the same direction, for the reason that the circuit through the winding C has been broken. With this arrangement it will be seen that it is impossible to start the motor twice in the same direction.

Having thus described my invention, what I claim as new and desire to secure by Letters Patent, is:

1. In a system of control for electric motors, the combination with an overload device, of means rendering said overload device inoperative upon closure of the motor circuit and automatically rendering the same free to respond after a predetermined period.

2. In a system of control for electric motors, the combination with an overload device, of electromagnetically controlled means for rendering said overload device inoperative for a temporary period after the motor circuit is closed.

3. In a system of control for electric motors, the combination with an overload device, means tending to render said overload device inoperative, and automatic means for operating said former means to render said overload device free to operate when the motor circuit attains a predetermined speed.

4. In a system of control for electric motors, the combination with an overload device, means tending to render said overload device inoperative, and an operating winding for said means adapted to be connected across the motor armature, said winding being adapted to actuate said means to render said overload device free to operate when the motor has attained a predetermined speed.

5. In a system of control for electric motors, the combination with an electromagnetic overload device, of a switch tending to establish a short circuit around the operating winding of said overload device, and means for automatically operating said switch to open said short circuit when the motor has attained a predetermined speed.

6. In a system of control for electric motors, the combination with an electromagnetic overload device, of a switch tending to short circuit said overload device, and an operating winding for said switch, adapted to be connected across the motor armature, said winding being adapted to actuate said switch to open said short circuit when the motor has attained a predetermined speed.

7. In a system of control for electric motors, the combination with a main switch, of an electromagnetic winding for operating said switch, a switch for controlling the circuit of said winding, an overload device for causing the deënergization of said winding upon an excessive flow of current through the motor, and automatically controlled means for rendering said overload device inoperative for a temporary period after said main switch is closed.

8. In a system of control for electric motors, the combination with a main switch for controlling the motor circuit, an electromagnetic winding for operating said main switch, a switch for controlling the circuit of said winding and tending to stand in an open position, means operated upon the closure of said main switch for establishing a maintaining circuit for said winding, an overload switch connected in said maintaining circuit and adapted to be opened upon an excessive flow of current through the motor circuit, and automatically controlled means for preventing the operation of said overload switch for a temporary period after the closure of said main switch.

9. In a system of control for electric motors, the combination with a main switch, of an electromagnetic winding for operating said switch, a switch for controlling the circuit of said winding, an overload device for causing the deënergization of said winding upon an excessive flow of current through the motor, a switch tending to short circuit the operating winding of said overload device, an operating winding for said last mentioned switch adapted to be connected across the motor armature for actuating said switch to open said short circuit when the motor has attained a predetermined speed.

10. In a system of control for electric motors, the combination with a main switch for controlling the motor circuit, an operating winding therefor, a switch for controlling the circuit of said winding and tending to stand in open position, means operated upon the closure of said main switch for establishing a maintaining circuit for said winding, a switch connected in said maintaining circuit, an overload device for opening said maintaining circuit upon an excessive flow of current through the motor, a switch tending to short circuit the operating winding of said overload device, and an operating winding for said last mentioned switch adapted to be connected across the motor armature for actuating said switch to open said short circuit when the motor has attained a predetermined speed.

11. In a system of control for electric motors, the combination with a pair of switches adapted to cause the motor to operate in opposite directions, an overload device for causing either of said switches, when closed, to open upon an excessive flow of current through the motor circuit, and automatically controlled means for rendering said overload device inoperative for a predetermined period after the motor circuit is closed.

12. In a system of control for electric motors, the combination with a pair of switches adapted to cause the motor to operate in opposite directions, means for preventing the closure of both of said switches at the same time, an overload device for causing either of said switches, when closed, to open upon an excessive flow of current through the motor, and automatically controlled means for rendering said overload device inoperative for a temporary period after the motor circuit is closed.

13. In a system of control for electric motors, the combination with a pair of switches adapted to cause the motor to operate in opposite directions, means necessitating the closure of said switches alternately, an overload device for causing either of said switches, when closed, to open upon an excessive flow of current through the motor, and automatically controlled means for rendering said overload device inoperative for a temporary period after the motor circuit is closed.

14. In a system of control for electric motors, the combination with a pair of switches adapted to cause the motor to operate in opposite directions, an operating winding for each of said switches, means for controlling the circuits of said windings, means for necessitating the energization of said windings alternately, an overload device for opening the circuit of either of said windings, when energized, upon an excessive flow of current through the motor, and automatically controlled means for rendering said overload device inoperative for a temporary period after the motor circuit is closed.

15. In a system of control for electric motors, the combination with a pair of switches adapted to cause the motor to operate in opposite directions, an operating winding for each of said switches, means for controlling the circuits of said windings, an overload device for opening the circuit of either of said windings, when energized, upon an excessive flow of current through the motor, a switch tending to short circuit the operating winding of said overload device, and automatic means for operating said switch to open said short-circuit when the motor has attained a predetermined speed.

16. In a system of control for electric motors, the combination with a pair of switches adapted to cause the motor to operate in opposite directions, an operating winding for each of said switches, means operated upon the closure of each of said switches for establishing a maintaining circuit for its operating winding, an overload device for opening the circuit of either of said windings, when energized, upon an excessive flow of current through the motor, a switch tending to short-circuit the operating winding of said overload device and an operating winding for said last mentioned switch adapted to be connected across the motor armature for actuating said switch to open said short-circuit when the motor has attained a predetermined speed.

17. The combination with a pair of independently movable switches tending to stand in open position, of means necessitating closure of said switches alternately.

18. The combination with a pair of switches tending to stand in open position, of an operating winding for each of said switches and means necessitating the energization of said windings alternately.

19. The combination with a pair of electromagnetically operated switches tending to stand in open position, of an electrical interlock necessitating the closure of said switches alternately.

20. The combination with a pair of switches, of an operating winding for each of said switches, and a switch operated upon the closure of each of said first mentioned switches necessitating the energization of said operating windings alternately.

21. In a system of control for electric motors, the combination with a pair of switches adapted to cause the motor to operate in opposite directions, an operating winding for each of said switches, means for controlling the circuits of said windings from a distance and means necessitating the energization of said windings alternately.

22. In a system of control for electric motors, the combination with a pair of switches adapted to cause the motor to operate in opposite directions, an operating winding for each of said switches, means for controlling the circuits of said windings from a distance, means operated upon the closure of each of said switches for establishing a maintaining circuit for the operating winding thereof and means operated upon the closure of each of said switches for opening the initial circuit of the winding thereof, said last mentioned means necessitating the energization of said windings alternately.

23. In a system of control for electric motors, the combination, with an overload device, of automatically controlled means for rendering said overload device inoperative for a temporary period after the motor circuit is closed, and automatic means for indicating when the overload device is free to operate.

24. In a system of control for electric motors, in combination an overload device, means for short circuiting the operating winding of said overload device for a temporary period after the motor circuit is closed, and electroresponsive means for indicating when said short circuit is opened.

25. In a system of control for electric motors, the combination with a main switch, of an operating winding therefor, means for controlling the circuit of said winding from a distance, means operated upon the closure of said switch for establishing a maintaining circuit for said winding and an electroresponsive indicating device connected in said maintaining circuit.

26. In a system of control for electric motors, the combination with a pair of switches for causing the motor to operate in opposite directions, means for controlling the operation of said switches from a distance, and automatic means for indicating which of said switches was last operated.

27. In a system of control for electric motors, the combination with a pair of switches for causing the motor to operate in opposite directions, an operating winding for each of said switches, means for controlling the circuits of said windings from a distance and an indicating device adapted to be automatically moved to one position when one of said windings is energized and into another position when the other of said windings is energized.

28. In a system of control for electric motors, the combination with a pair of switches for causing the motor to operate in opposite directions, of an operating winding for each of said switches, means for controlling the circuits of said windings from a distance, an indicating device and a pair of operating windings for moving said indicating device in opposite directions, one of said windings being connected in series with each of the operating windings of said switches.

29. In a system of control for electric motors, the combination with a main switch, of means for controlling the operation of said switch from a distance, means for indicating when said main switch is closed, an overload device for causing said main switch to open upon an excessive flow of current through the motor, and automatic means for rendering said overload device inoperative for a temporary period after the motor circuit is closed.

30. In a system of control for electric motors, the combination with a main switch, of means for controlling the operation of said main switch from a distance, means for indicating when said switch is closed, an overload device for causing said main switch to open upon an excessive flow of current through the motor, automatic means for rendering said overload device inoperative until the motor has attained a predetermined speed, and means for indicating when the motor has attained said predetermined speed.

31. In a system of control for electric motors, the combination with a main switch, of an operating winding therefor, means for controlling the circuit of said winding from a distance, means operated upon the closure of said switch for establishing a maintaining circuit for said winding, and an electro-responsive indicating device connected in said maintaining circuit, an overload device for causing the deënergization of said winding upon an excessive flow of current through the motor, means tending to short-circuit the operating winding of said overload device, said means being adapted to automatically open said short-circuit when the motor has attained a predetermined speed and means for indicating when said short-circuit has been opened.

32. In a system of control for electric motors, the combination with a pair of switches for causing the motor to operate in opposite directions, an operating winding for each of said switches, means for controlling the circuits of said windings from a distance, an overload device for opening the circuit through either of said windings, when energized, upon an excessive flow of current through the motor, automatically controlled means for rendering said overload device inoperative for a predetermined period after the motor circuit is closed, and an indicating device adapted to be automatically moved into one position upon the closure of one of said switches and into another position upon the closure of the other of said switches.

33. In a system of control for electric motors, in combination, a pair of switches for causing the motor to operate in opposite directions, an operating winding for each of said switches, means for controlling the circuits of said windings from a distance, means necessitating the energization of said windings alternately, an overload device for opening the circuit of either of said windings, when energized, upon an excessive flow of current through the motor, and automatically controlled means for rendering said overload device inoperative for a temporary period after the motor circuit is closed.

In witness whereof, I have hereunto subscribed my name in the presence of two witnesses.

THOMAS E. BARNUM.

Witnesses:
OSCAR A. KELLER,
WALTER E. SARGENT.